United States Patent [19]

Schmidt

[11] Patent Number: 4,672,932
[45] Date of Patent: Jun. 16, 1987

[54] FULL-FLOW FILTER FOR INTERNAL COMBUSTION ENGINE, ADAPTABLE FOR USE WITH A BY-PASS FILTER

[75] Inventor: Donald R. Schmidt, San Antonio, Tex.

[73] Assignee: Encon Systems, Ltd., San Antonio, Tex.

[21] Appl. No.: 916,194

[22] Filed: Oct. 7, 1986

[51] Int. Cl.⁴ ............................................. F01M 1/00
[52] U.S. Cl. .......................... 123/196 A; 123/196 R; 210/168; 184/6.21
[58] Field of Search ...................... 123/196 R, 196 A; 210/168; 184/6.21, 6.24

[56] References Cited

U.S. PATENT DOCUMENTS

| | | | |
|---|---|---|---|
| 2,076,936 | 4/1937 | Burckhalter | 210/134 |
| 2,098,725 | 11/1937 | Hurn | 210/131 |
| 2,271,054 | 1/1942 | Williams | 210/131 |
| 2,547,857 | 4/1951 | Cook | 210/169 |
| 2,559,267 | 7/1951 | Winslow et al. | 210/183 |
| 2,605,904 | 8/1952 | Ogilvie | 210/183 |
| 2,670,851 | 3/1954 | Curtis | 210/120 |
| 2,680,520 | 6/1954 | Beardsley | 210/164 |
| 2,843,268 | 7/1958 | Kennedy | 210/295 |
| 2,929,506 | 3/1960 | Belgarde | 210/315 |
| 2,966,269 | 12/1960 | Allen | 210/132 |
| 2,995,253 | 8/1951 | Belgarde et al. | 210/323 |
| 3,021,954 | 2/1962 | Allen | 210/132 |
| 3,317,045 | 5/1967 | Dummler | 210/130 |
| 3,540,594 | 11/1970 | Sanderson | 210/232 |
| 3,868,327 | 2/1975 | Van Gilder et al. | 210/457 |
| 4,036,755 | 7/1977 | Dahm et al. | 210/168 |
| 4,406,784 | 9/1983 | Cochran | 210/168 |
| 4,524,733 | 6/1985 | Schmidt | 123/196 |
| 4,561,395 | 12/1985 | McMullen | 123/196 A |

Primary Examiner—E. Rollins Cross
Attorney, Agent, or Firm—Gunn, Lee & Jackson

[57] ABSTRACT

An apparatus for filtering the oil flow of an engine. The apparatus includes a full-flow filter, whose forward end is adapted to permit use of the full-flow filter either with or without a by-pass filter. The rear end of the full-flow filter is attached to an oil filter bushing, in the same manner as the typical spin-on type oil filter. If the user desires to use the full-flow filter with the by-pass filter, a small hole may be punched in the forward end of the full-flow filter. From this hole, a small portion of oil flows through a connecting hose into the by-pass filter. This small portion of oil is then filtered by the by-pass filter and flows out of the by-pass filter through a second connecting hose to an existing oil system line access, such as the drain pan plug, oil filter cap, or engine valve cover. The by-pass filter is mounted to the engine with a sleeve having grommets. A method of retrofitting an engine for use with the full-flow filter and by-pass filter is also provided.

9 Claims, 6 Drawing Figures

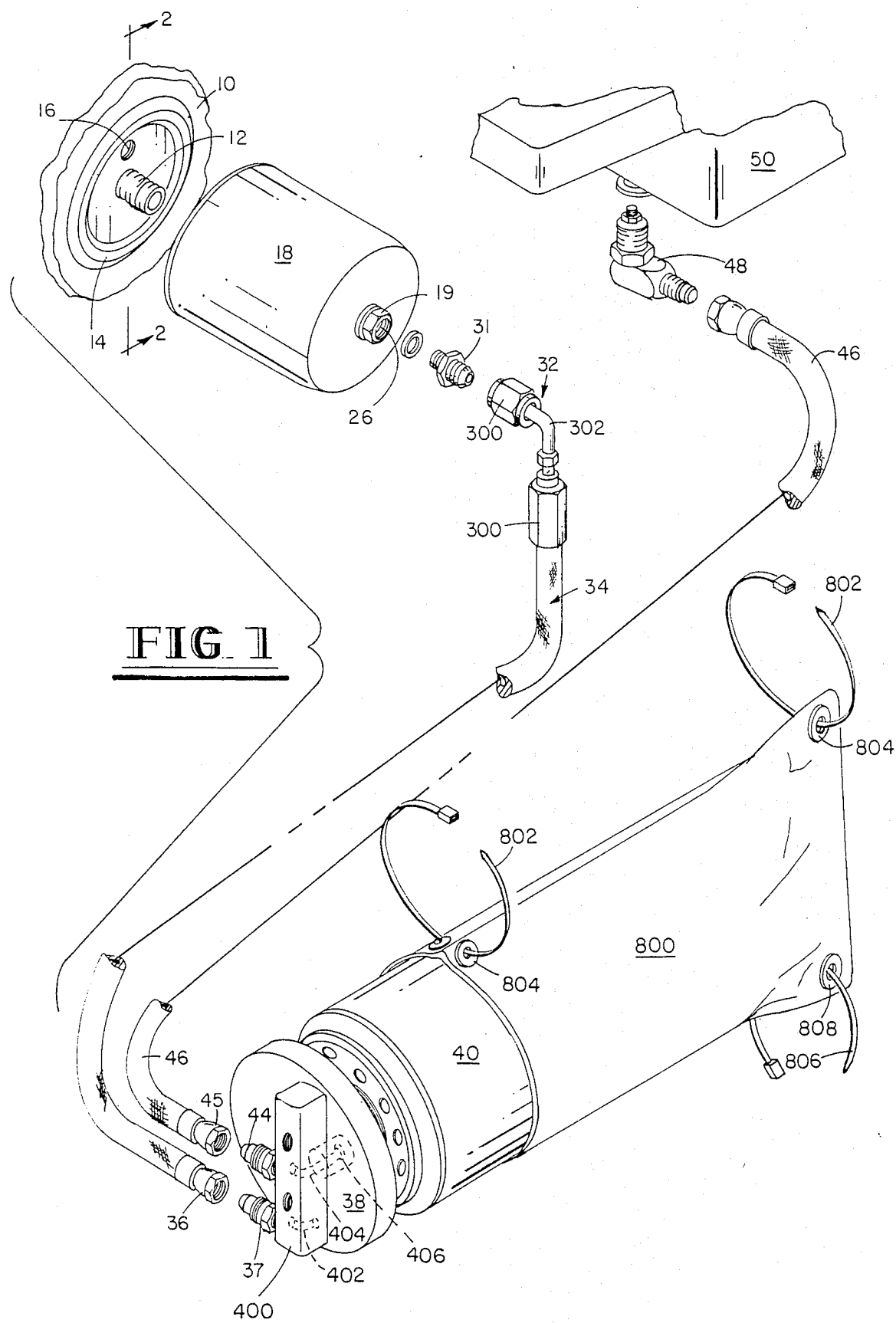

FULL-FLOW FILTER FOR INTERNAL COMBUSTION ENGINE, ADAPTABLE FOR USE WITH A BY-PASS FILTER

BACKGROUND OF THE INVENTION

This invention is an improvement over U.S. Pat. No. 4,524,733, issued June 25, 1985, and U.S. Pat. No. 4,452,695, issued June 5, 1984, to the same inventor as the present patent. The prior inventions are incorporated by reference into the present application.

The invention deals with the field of oil filtering systems for internal combustion engines, particularly systems using a combination of a full-flow and a by-pass filter. It is conventional practice to use an oil filter situated in an oil system delivery line to clean oil used to lubricate internal combustion engines. The filter system may operate with either a full-flow filter, a by-pass filter, or some combination of the two.

BRIEF DESCRIPTION OF THE PRIOR ART

At the present time, the most common type of filtering system uses a full-flow filter. The term "full-flow" is used because the filter is capable of filtering the entire flow of oil for the engine. This filter is commonly referred to as a spin-on filter and is usually mounted on the engine crankcase by means of an oil filter bushing. The filter is of the surface type and is quite porous. This allows the filter to maintain a high flow rate, and thereby not diminish the appropriate degree of oil pressure throughout the engine. Accordingly, full-flow filters require low pump pressure, but are not entirely adequate to remove all impurities from the oil. Over time, dirt accumulates and clogs the filter. To prevent cessation of oil flow through the full-flow filter, it must operate in conjunction with an oil filter relief valve. This relief valve opens when the full-flow filter becomes excessively clogged, but then the oil is not filtered at all.

Alternatively, some oil filter systems use a by-pass oil filter. The by-pass filter is a high density filter; thus the oil is filtered beyond the level of filtration achieved by the full-flow filter. A disadvantage of the by-pass system, however, is that if only a by-pass filter is used, its high density requires that less than the full flow of oil be filtered in a single pass in order to sustain oil flow through the system. Additionally, there is no backup protection if larger particles contaminate the oil because they may not be filtered in the by-pass filter as soon as if a full flow filter were used.

In order to have the advantages of both the full-flow and by-pass filtering, engines may be equipped with both a primary, full-flow filter and a secondary, by-pass filter. One device used in the past consists of a combination of a full-flow and a high density filter in a single unit, as shown in Dahm, et al., U.S. Pat. No. 4,036,755. However, filtering systems of this type do not easily permit connection to a standard engine filtering system. Also, an inherent problem with such systems is that the high-density portion of the filter quickly becomes clogged, resulting in the entire flow passing through the full-flow filter. The entire unit must then be replaced. Such combination filters are disclosed in the following United States Patents: U.S. Pat. Nos. 2,995,253 and 2,929,506 to Belgarde, et al.; U.S. Pat. No. 2,680,520 to Beardsely; U.S. Pat. No. 2,843,268 to Kennedy; and U.S. Pat. Nos. 2,966,269 and 3,021,954 to Allen.

Other filter systems used in the past permit full-flow filters to receive a connection to a separate by-pass filter. Some of such dual filtering systems use a special adapter that fits between the rear end of the full-flow filter and the engine crankcase. Dual filter systems with adapters of this type are disclosed in the following United States Patents: U.S. Pat. No. 4,561,395 to McMullen; U.S. Pat. No. 4,452,695 to Schmidt; U.S. Pat. No. 4,406,784 to Cochran; and U.S. Pat. No. 3,540,594 to Sanderson.

Filtering systems have also been used in which one end of a full-flow filter receives a nut, rod, or bolt. U.S. Pat. No. 2,670,851 issued to Curtis and U.S. Pat. No. 2,547,857 issued to Cook disclose filters adapted to receive a bolt in the forward end thereof and having an inlet passage transverse to an outlet passage. U.S. Pat. No. 2,605,904 issued to Ogilvie, U.S. Pat. No. 2,098,725 issued to Hurn, U.S. Pat. No. 2,076,936 issued to Burckhalter, U.S. Pat. No. 2,271,054 issued to Williams and U.S. Pat. No. 2,559.267 issued to Winslow, et al., all disclose filters that receive a nut, rod, or bolt on the uppermost or forward end thereof.

U.S. Pat. No. 3,317,045 issued to Dummler discloses a filter having an inlet passage opposite an outlet passage. U.S. Pat. No. 3,868,327 issued to Van Gilder and Schmidt discloses a filter adapted for outward passage of oil (after the filtering thereof) through a fitting on the forward end of the filter opposite the inlet fitting.

U.S. Pat. No. 4,524,733 to Schmidt, of which the present patent is an improvement, is a dual filter system, whose full-flow filter is modified at the forward end. The forward end of the full-flow filter has at its center, a small bore preferably inwardly threaded to receive a connection to a by-pass filter hose. U.S. Pat. No. 4,561,395 to McMullen also discloses a dual filtering system in which a hole is drilled in the full-flow filter. That invention does not, however, disclose any means for controlling the size of the hole or otherwise restricting the flow of oil into the by-pass filter.

None of the prior filtering systems use a full-flow filter that is designed so that it may be used alone, without the by-pass filter. To the contrary, these modified full-flow filters inhibit such use. The design of these filters incorporates an adapter means for receiving a rod, bar, bolt, or other fitting on one end to create an access point from the full-flow filter to the oil line, thereby permitting connection of the intervening by-pass filter. When used without a by-pass filter, some means must be devised for plugging these access points. Thus, the access points create the possibility of leakage and loss of pressure if the full-flow filter is attempted to be used without the by-pass filter.

The present patent improves on the prior systems by including a full-flow filter that may be economically and conveniently used as a replacement for standard full-flow filters. Alternatively, it may be used together with a separate by-pass filter. A nut on the forward end of the full-flow filter facilitates its installation and removal.

If the full-flow filter is to be used alone, it is installed in the same manner as the standard spin-on filter, without any additional procedures. The entire oil system flow is filtered by the full-flow filter. Alternatively, if it is to be used with the by-pass filter, the nut in its forward end serves as a guide for punching a restrictive orifice to allow oil flow to the by-pass filter. Because the full-flow filter is adapted for such use by simply punching a hole, the user is not required to pay the cost of manufacturing a filter with complicated adapter means that an individual may not wish to use. Nor is the user required to retrofit the adapter means in order to use the full-flow filter without a by-pass filter.

SUMMARY OF THE INVENTION

An object of the invention is to provide an oil filtering apparatus for internal combustion engines that is adapted to maximize engine wear protection and oil service life. A full-flow oil filter may be used alone or in combination with a by-pass filter, without impairing the necessary circulation of oil flow through the engine.

A further object of the invention is to facilitate installation and removal of the full-flow filter, whether used alone or together with the by-pass filter. Thus, a nut extending outwardly from the forward end of the full-flow filter permits the filter to be turned or held with a standard tool, such as a wrench.

A further object of the invention is to eliminate the necessity of a separate adapter mechanism for passage of the oil to the by-pass filter. Thus, the forward end of the full-flow filter is adaptable to receive one end of a hose connecting the full-flow and the by-pass filter.

A further object of the invention is to restrict and control the flow of oil into the by-pass filter. Thus, the full-flow filter provides a means for accurately punching the correct circumference of the orifice through which oil passes from the full-flow filter toward the by-pass filter. This orifice is located inside the nut on the forward end of the full-flow filter. The nut provides a collar upon which the action of a punching device can be defined. A base plate of the by-pass filter also provides a means for predetermining the circumference of the input orifice into the by-pass filter.

A further object of the invention is to provide a by-pass filter that is easy to install and mount inside various types of engine compartments. Similarly, the by-pass filter is easy to remove and replace when it becomes clogged. Thus, flexible hoses connect the full-flow filter to the by-pass filter and the by-pass filter to the oil flow line. The hose connections are facilitated by male-female screw connectors. The nut on the forward end of the full-flow filter is inwardly threaded and receives a hollow coupling bolt which is further connected to the first end of an input hose to the by-pass filter. The second end of the input hose is connected by means of a hose fitting extending outwardly from the base plate of the by-pass filter. The output hose from the by-pass filter is also connected by means of hose fittings.

A further object of the invention is to permit the oil to be returned to the oil system line after being filtered by the by-pass filter, without the need to disrupt the structural integrity of the existing oil line system. Thus, the oil flows from the output hose to the oil line system through an existing access point, such as the oil pan, oil cap, or engine valve cover, of the engine.

DESCRIPTION OF THE DRAWINGS

FIG. 1 is a partially exploded perspective view of the full-flow filter, as installed on an engine crankcase, with a by-pass filter attached, showing re-entry of the oil flow to the oil pan plug.

FIG. 2A shows the full-flow filter as used without the by-pass filter. FIG. 2B illustrates the device used to punch the restrictive orifice. FIG. 2C illustrates the assembly of the full-flow filter with attachment of a fitting for a connecting hose to the by-pass filter.

DESCRIPTION OF THE PREFERRED EMBODIMENT

Figure 2A:
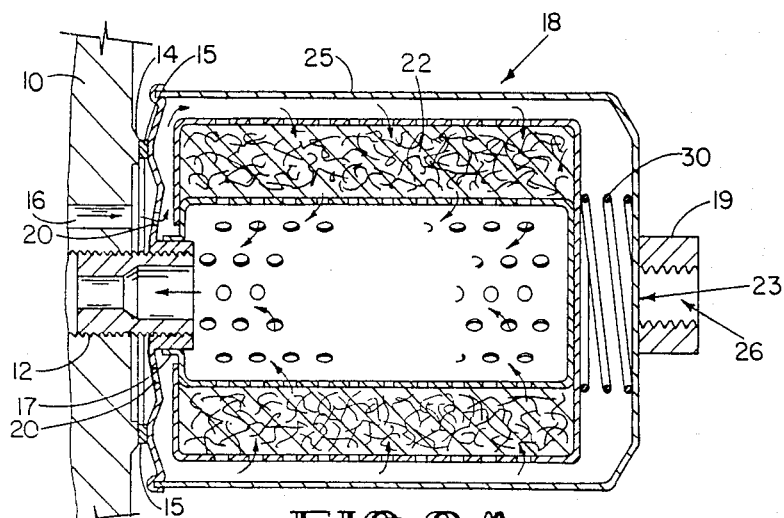
FIGS. 2A, 2B and 2C are a series showing crosssectional views of the full-flow filter as installed on the engine crankcase, along section lines 1—1 of FIG. 1.

Referring to FIG. 1, an engine block 10 has an oil filter bushing 12 mounted therein that connects to a full-flow, disposable filter 18. The full-flow filter 18 screws on to the bushing 12 and butts against the raised boss 14 of the engine block 10. Oil from an oil pump (not shown) is pumped through an opening 16 in the engine crankcase. The oil is pumped at a sufficiently high pressure to maintain oil flow through the filter system and other parts of the engine.

As illustrated in FIGS. 1 and 2A, after passing through opening 16 in the engine crankcase, the oil passes into the full-flow filter 18 through openings 20. Seal 15 of the modified full-flow filter 18 rests against boss 14 to prohibit any leakage of oil. Installation and replacement of the full-flow filter are facilitated by a nut 19 attached to its forward end.

As illustrated by the arrows in FIG. 2A, when the full-flow filter 18 is used without a by-pass filter, all of the oil that enters the full-flow filter 18 flows around the outside of the filter element 22 and re-enters the engine after flowing through filter element 22 and oil filter bushing 12. A spring 30 exerts a continuous pressure on filter element 22 in the direction of the raised boss 14. Spring 30 keeps filter element 22 in place on its base, inside the full flow filter. If the full-flow filter becomes clogged with dirt after long use, it is necessary for the oil to by-pass the full-flow filter entirely so that oil may reach the engine. For this reason, a relief valve (not shown) opens when a predetermined amount of pressure is reached in the area surrounding the filter element, causing the oil to by-pass the full-flow filter.

Figure 2B:
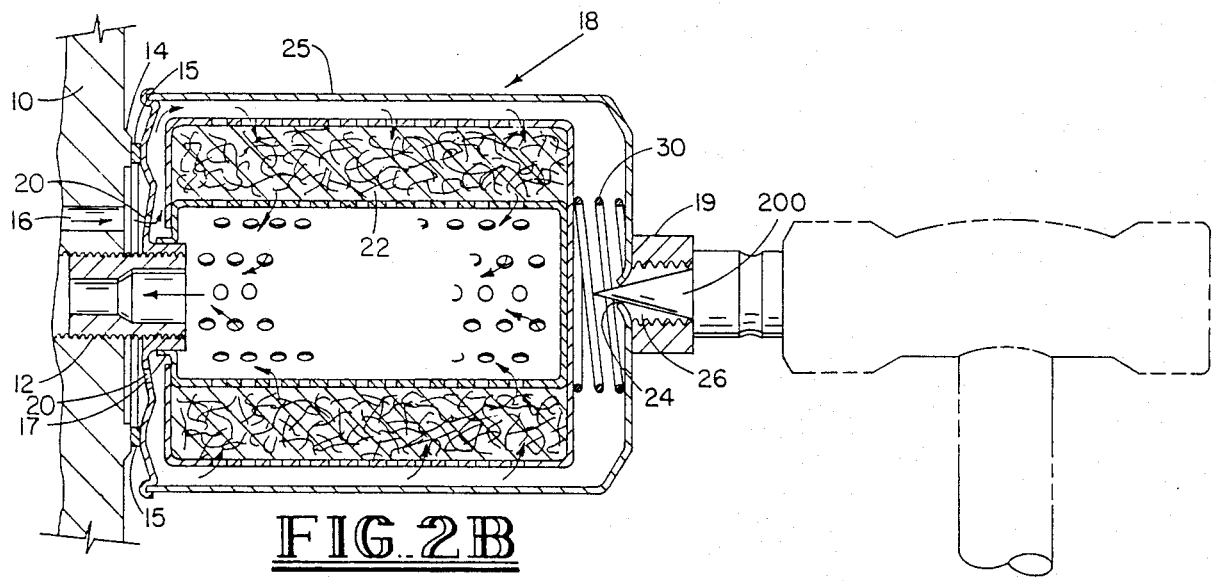

As illustrated by FIG. 2A, the internally threaded passage 26 of the nut 19 defines a small surface area 23 on the forward end of the full-flow filter. The nut 19 may be formed as part of the housing 25 or welded thereto. As illustrated in FIG. 2B, by puncturing an orifice 24 into the surface 23, the full-flow filter is adapted for use with the by-pass filter 40 shown in FIG. 1. Orifice 24 is aligned with internally threaded passage 26 of the nut 19. The diameter of orifice 24 restricts and controls the amount of flow of oil into the by-pass filter 40. This diameter is determined by the size of the taper on the puncturing device 200 and by the height of the nut 19.

Figure 2C:
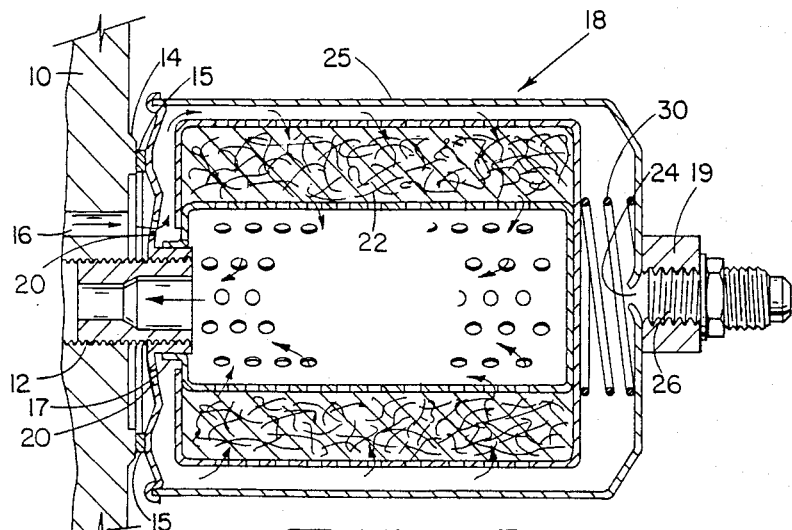

When so adapted for use with the by-pass filter 40, as illustrated by the arrows in FIG. 2C, the full-flow filter 18 receives the full-flow of oil through openings 20 from the oil pump (not shown). About ninety-five percent of the oil within modified full-flow filter 18 flows around the outside of the filter element 22 and re-enters the engine by flowing through filter element 22 and oil filter bushing 12. Approximately five percent of the oil also flows around the outside of the filter element 22, but is not filtered thereby. The oil flows out of the full-flow filter 18 through orifice 24 and the internally threaded passage 26 of the nut 19 to the by-pass filter 40.

Referring again to FIG. 1, a hollow coupling bolt 31 is externally threaded at both of its two ends. The first end of bolt 31 is adapted to be threadably connected to and received within the internally threaded passage 26 of nut 19. The second end of bolt 31 is received within a first end of elbow hose fitting 32. Elbow hose fitting 32 is discussed in further detail below. A first by-pass filter hose 34 is connected at a first end thereof to the elbow hose fitting 32. The first by-pass filter hose 34 is further connected at a second end thereof to the female by-pass input hose fitting 36, which is connected to a male by-pass input hose fitting 37, which extends from base plate 38 of the by-pass filter.

Oil flows from the full-flow filter 18, through hollow coupling bolt 31, through elbow hose fitting 32, through the by-pass filter hose 34, and through by-pass input hose fittings 36 and 37. The oil then flows into by-pass filter 40 through an input passage 402 in by-pass filter base 38. The male by-pass input hose fitting 37 is hollow and is aligned with input passage 402. The by-pass filter 40 contains a filtering element (not shown) mounted inside.

After the oil is filtered by the by-pass filter 40, it flows out of the by-pass filter 40 through the by-pass output male hose fitting 44 which is hollow and is aligned with the output passage 404 in by-pass filter base 38. The oil then flows through an output hose 46 which is connected on its first end to by-pass output female hose fitting 45. Output hose is connected on its second end thereof to a hollow swivel coupling 48.

Figure 3:
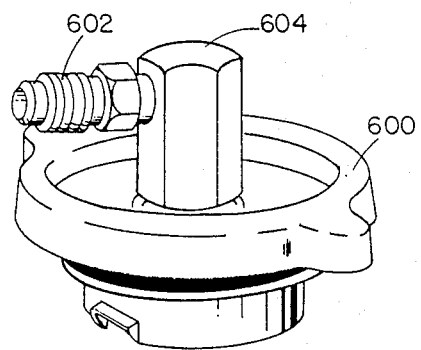
FIG. 3 is a perspective views of an alternate means for re-entry of oil from the by-pass filter to the oil system line through the oil cap.
Figure 4:
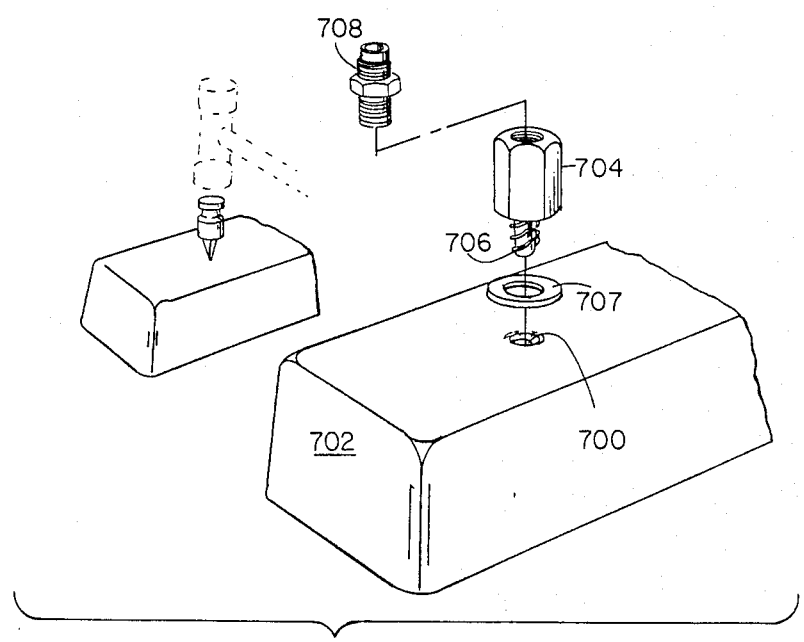
FIG. 4 is a perspective view of an alternate means for re-entry of oil from the by-pass filter to the oil system line through the engine valve cover.

The hollow swivel coupling 48 is connected to an access point on the low pressure side of the oil flow system. The access point may be either the oil pan 50 as shown in FIG. 1, the oil cap 58 as shown in FIG. 3, or the engine valve cover as shown in FIG. 4. In FIG. 1, the standard drain plug (not shown) in oil pan 50 is replaced with hollow swivel coupling 48, whose boss 66 may be enlarged or otherwise modified so that it is accommodated by the drain plug orifice (not shown) in oil pan 50.

Elbow hose fitting 32 is further described as follows. At the input and output ends of the elbow hose fitting 32 are a first and second barrel tighteners 300, which have a hollow, threaded cylindrical bore along a horizontal axis. The first barrel tightener 300 is at the input end of the elbow hose fitting 32. It connects the coupling bolt 31 to an outwardly threaded first end of an elbow tube 302. The first barrel tightener 300 rotates around its horizontal axis and screws together the coupling bolt 31 and the elbow tube 302. The second barrel tightener 300 is at the output end of the elbow hose fitting 32. It connects the elbow tube 302 to the first end of the by-pass filter hose 34. The second barrel tightener 300 screws around the outwardly threaded end of the elbow tube 302.

By-pass filter base 38 is further described as follows. An interface bar 400 extends outwardly from and across the diameter of base plate 38. An input passage 402 and output passage 404 through the interface bar 400 allow oil to flow into and out of the by-pass filter 40. Input passage 402 the output passage 404 are internally threaded and receive the by-pass male fittings 37 and 44, respectively. The size of the input passage 402 may be varied to control the oil flow into the by-pass filter. The output passage 404 leads to an outwardly threaded hollow bolt 406, which extends from the center of the base plate 38, and serves as a connecting means for the by-pass filter.

FIGS. 3 and 4 illustrate alternative access points from the oil filter system to the low pressure side of the oil flow system. In FIG. 3 standard oil cap 600 is modified to accommodate the threaded portion of a hollow coupling bolt 602 and hollow coupler head 604. The hollow coupling bolt 602 and hollow coupler head 604 rotate independently of the oil cap 600, thereby allowing the oil cap 600 to be removed and replaced without interference from the coupling bolt 602 and head 604. In FIG. 4, an orifice 700 is punched into the engine valve cover. A hollow nut 704, having a hollow tapered screw 706 projecting from its first end, is screwed into the orifice 700. A flat washer 707 seals the connection. The second end of the hollow nut 704 is inwardly threaded and receives the outwardly threaded first end of either a hollow bolt coupling 708. The outwardly threaded second end of the bolt coupling 708 receives a female connector at the end of flexible hose 46.

Referring again to FIG. 1, the by-pass filter 40 may be mounted to the engine compartment by means of sleeve 800 or mounting bracket or clamps (not shown). Sleeve 800 has grommet tabs 802 extending therefrom with grommets 804 located therein for connection to any convenient portion of the vehicle. Also there is a bottom grommet tab 806 extending from grommet 808 for connection of the by-pass filter inside sleeve 800 at any convenient location.

To use the present invention in an automotive vehicle, the conventional full-flow, spin-on type oil filter is removed and replaced with the modified full-flow filter 18. When the engine is running and only the full-flow filter 40 is installed, all of the oil will flow through opening 16 and be filtered through filter element 22. The oil will then return directly to the engine from the filtering system through oil filter bushing 12.

Optionally, the by-pass filter 40 is also installed in a suitable location within the engine compartment. A hole is punched in the forward end of full-flow filter 18, using a sharp implement 200, specifically designed to puncture a hole of the appropriate size. The puncturing implement 200, illustrated in FIG. 2B, is tapered. The depth of the nut 19 and the taper of the puncturing implement 200 determine the size of the orifice 24. Thus, by measuring the depth of the nut 19, a puncturing implement 200 can be selected with a taper that will result in the orifice 24 being of a predetermined size. In this manner, the flow of oil into the by-pass filter 40 can be controlled and restricted as is appropriate for the particular vehicle on which the by-pass filter 40 is installed.

Using the nut 19 on the forward end of the full-flow filter 18, the filter 18 replaces the conventional spin-on filter by being screwed onto the bushing 12. The by-pass filter input hose 34 and by-pass filter output hose 46 are connected to the appropriate fittings 32, 37, 44 and 48, between the full-flow filter 18 and by-pass filter 40 and by-pass filter 40 and oil pan 50. Alternatively, the by-pass filter output hose is connected to fitting 602 between the by-pass filter and the oil cap, or to fitting 708 between the by-pass filter and the engine valve cover. A sealant, such as a commercially-available silicon sealant, may be applied to the outside surface of each fitting to prevent oil leakage.

When the engine is running and both the full-flow and the by-pass filters are installed, oil will flow through opening 16 in the engine block 10 to the full-flow filter 18. Approximately ninety-five percent (95%) or a first portion of the oil will flow through filter element 22 to reenter the engine by flowing through oil filter bushing 12. However, about five percent (5%) or a second portion of the oil flows through the length of the full-flow filter 18 and out its forward end through orifice 24. This second portion of oil then flows through fitting 32 into hose 34, through fittings 36 and 37 and into the by-pass filter 40. By-pass filter 40 filters this second portion of oil, which then flows into hole 46 through fittings 44 and 45 and returns to the oil system at the oil pan 50, oil cap 600, or engine valve cover 702.

It is to be understood that the pressure drop in the full-flow filter 18 is very low; it can, therefore, replace an ordinary spin-on filter. The full system pressure of the engine is provided to the by-pass filter 40 and connections thereto. A much denser filter medium is used in by-pass filter 40 than in the full-flow filter 18. Therefore, the return for the by-pass filter 40 is to the oil pan 50 or the oil cap 600, or the engine valve cover 702, which are at the low pressure side of the oil system.

While the invention full-flow filter and by-pass filter apparatus, fittings, and method of retrofitting have been described in connection with their preferred embodiments, the description is not intended to limit the invention to the particular forms set forth. To the contrary, the description is intended to cover such alternatives, modifications, and equivalents as may be included within the spirit and scope of the invention as defined by the appended claims.

I claim:

1. Filter apparatus for an internal combustion engine to replace a spin-on, full-flow oil filter threadably connected to an oil filter bushing, said engine having an oil system with an oil pump and having an oil pan and an oil cap at a low pressure side of the oil system, said apparatus comprising:
   a full-flow filter to be connected to said oil filter bushing to permit oil within said oil system to flow into said full-flow filter, said full-flow filter being of such density and filtering capacity that said oil flows from said oil pump through said full-flow filter with a minimum pressure drop;
   adapter means to permit use of the full-flow filter either with or without a by-pass filter, said adapter means being a nut located at the forward end of said full-flow filter opposite said oil filter bushing and extending outwardly, said nut defining an area that can be either left intact, thereby permitting all of said oil to flow outward from said full-flow filter after filtering, or punctured, thereby permitting most of said oil to flow outward from the full-flow filter after filtering and a small portion of said oil to flow outward therefrom prior to filtering, said nut being within a specific range of depth and circumference so as to provide a means for controlling the size of said hole, and said nut being inwardly threaded.

2. Filter apparatus for an internal combustion engine to replace a spin-on, full-flow oil filter threadably connected to an oil filter bushing, said engine having an oil system with an oil pump and having an oil pan, an oil cap, and an engine valve compartment, at a low pressure side of the oil system, said apparatus comprising:
   a full-flow filter to be connected to said oil filter bushing to permit oil within said oil system to flow into said full-flow filter, said full-flow filter being of such density and filtering capacity that said oil flows from said oil pump through said full-flow filter with a minimum pressure drop;
   adapter means to permit use of the full-flow filter either with or without a by-pass filter, said adapter means being a nut located at the forward end of said full-flow filter opposite said oil filter bushing and extending outwardly, said nut defining an area that can be either left intact, thereby permitting all of said oil to flow outward from said full-flow filter afer filtering, or punctured, thereby permitting most of said oil to flow outward from the full-flow filter after filtering and a small portion of said oil to flow outward therefrom prior to filtering, said nut being within a specific range of width and depth so as to provide a means for controlling the size of said hole, and said nut being inwardly threaded;
   a by-pass filter for filtering said small portion of oil prior to returnng to said oil system through said oil cap or oil pan, said by-pass filter having a base plate that is adapted to allow said small portion of oil to flow into and out of said by-pass filter;
   a first flexible hose, whose first end is adapted to be connected to a first fitting and whose second end is adapted to be connected to a second fitting, said first fitting being adapted to be connected to said by-pass nut and said second fitting being adapted to be connected to said base plate, for permitting flow of said small portion of oil between said full-flow filter and said by-pass filter;
   a second flexible hose, whose first end is adapted to be connected to a third fitting and whose second end is adapted to be connected to a fourth fitting, said third fitting being adapted to be connected to said base plate and said fourth fitting being adapted to be connected to said oil pan, oil cap, or engine valve compartment; and
   means for mounting said by-pass filter on said engine.

3. Filter apparatus as recited in claim 2, wherein the fitting between the full flow filter and the first end of the first flexible hose is an elbow fitting, said elbow fitting having a hollow bolt coupling to the full flow filter, a first and second barrel tightener, and a hollow elbow tube, said barrel tighteners being inwardly threaded, said first barrel tightener receivng the externally threaded first end of said elbow and one end of said bolt coupling, said second barrel tightener receiving the externally threaded second end of said elbow and said first end of said first flexible hose.

4. Filter apparatus as recited in claim 3, wherein the fittings between the first and second flexible hoses and the by-pass filter are male-female screw fittings.

5. Filter apparatus as recited in claim 4, wherein the fitting between the second flexible hose and the oil pan is a hollow swivel coupling having hollow internal passageways and outwardly threaded bosses.

6. Filter apparatus as recited in claim 5, wherein said means for mounting said by-pass filter on said engine is a sleeve, into which said by-pass filter is placed, said sleeve having grommets for fastening the sleeve to convenient locations inside said engine.

7. A method of retrofitting an engine to provide for by-pass oil filtering of a small portion of oil flowing from an oil pump of said engine, said method consisting of the following steps:
   removing a spin-on full-flow filter from an oil filter bushing;
   puncturing a hole in the forward end of a modified full-flow filter;

replacing said spin-on full-flow filter by threadably connecting said full-flow filter to said oil filter bushing;

mounting said independent by-pass filter with respect to said engine, said by-pass filter having a base plate that is adapted to allow a small portion of oil to flow into and out of said by-pass filter;

connecting an input end of said by-pass filter through said base plate to a forward end of said modified full-flow filter by a first flexible hose to receive therethrough said small portion of said oil flowing through said modified full-flow filter;

connecting an output end of said by-pass filter through said base plate to an oil pan, oil cap, or engine valve cover, of said engine via a second flexible hose; and replacing a normal drain plug with a special drain plug having a right angle fitting, said special drain plug being adapted to connect to said oil pan, allowing oil from said by-pass filter to flow through said right angle fitting into said oil pan.

8. The method of retrofitting as recited in claim 6 wherein instead of replacing a normal drain plug with a special drain plug, one step is replacing a normal oil cap with a special oil cap, having a hollow coupling fitting, allowing oil from said by-pass filter to flow through said coupling fitting into said oil cap.

9. The method of retrofitting as recited in claim 5, wherein instead of replacing a normal drain plug with a special drain plug, one step is punching an orifice into said engine valve cover, and inserting a special hollow fitting into said orifice, said hollow fitting receiving one end of said second flexible hose.

* * * * *